US011444350B2

(12) United States Patent
He

(10) Patent No.: US 11,444,350 B2
(45) Date of Patent: Sep. 13, 2022

(54) PACKAGING MATERIAL FOR POWER STORAGE DEVICE, AND POWER STORAGE DEVICE

(71) Applicant: SHOWA DENKO PACKAGING CO., LTD., Kanagawa (JP)

(72) Inventor: Wei He, Kanagawa (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 0 days.

(21) Appl. No.: 16/233,181

(22) Filed: Dec. 27, 2018

(65) Prior Publication Data
US 2019/0198825 A1 Jun. 27, 2019

(30) Foreign Application Priority Data

Dec. 27, 2017 (JP) .............................. JP2017-250366

(51) Int. Cl.
H01M 50/103 (2021.01)
H01M 50/116 (2021.01)
(Continued)

(52) U.S. Cl.
CPC ..... *H01M 50/124* (2021.01); *H01M 10/0525* (2013.01); *H01M 50/103* (2021.01);
(Continued)

(58) Field of Classification Search
CPC .. H01M 2/0287; H01M 2/08; H01M 10/0525; H01M 2002/0297;
(Continued)

(56) References Cited

U.S. PATENT DOCUMENTS 8,071,238 B2  12/2011  Seino
10,581,032 B2  3/2020  Muraki et al.
(Continued)

FOREIGN PATENT DOCUMENTS

CN  102468461 A  5/2012
CN  103918100 A  7/2014
(Continued)

OTHER PUBLICATIONS

Third-party Observation submitted to the Japan Patent Office on Oct. 8, 2021 against corresponding Japanese patent application No. 2017-250366 (pp. 1-5).
(Continued)

*Primary Examiner* — Kwang Han
(74) *Attorney, Agent, or Firm* — Millen White Zelano and Branigan, PC; Csaba Henter

(57) ABSTRACT

A packaging material for a power storage device includes a base material layer as an outer layer, a heat fusible resin layer as an inner layer, and a metal foil layer arranged between both the layers. The base material layer and the metal foil layer are adhered via an outer adhesive layer. The outer adhesive layer is formed of a cured film of a two-part curing type urethane adhesive agent including a main agent containing a polyol and a multifunctional isocyanate mixture, wherein a content rate of the polyol is 50 mass % to 95 mass %. The multifunctional isocyanate mixture is composed of a mixture containing an aromatic multifunctional isocyanate and an aliphatic multifunctional isocyanate having an aromatic ring.

14 Claims, 2 Drawing Sheets

(51) Int. Cl.
*H01M 50/124* (2021.01)
*H01M 10/0525* (2010.01)
*H01M 50/183* (2021.01)
*H01G 11/80* (2013.01)
*H01M 50/131* (2021.01)

(52) U.S. Cl.
CPC ....... *H01M 50/116* (2021.01); *H01M 50/183* (2021.01); *H01G 11/80* (2013.01); *H01M 50/131* (2021.01)

(58) Field of Classification Search
CPC ............. H01M 50/124; H01M 50/103; H01M 50/183; H01M 50/131; H01M 50/116; H01G 11/80; H01G 11/78; Y02E 60/10; Y02T 10/70; B32B 7/12; B32B 27/06; B32B 27/36; B32B 27/34; B32B 27/32; B32B 15/20; B32B 15/18; B32B 15/085; B32B 15/09; B32B 15/088; B32B 27/20; B32B 2307/306; B32B 2307/31; B32B 2307/7244; B32B 2307/7246; B32B 2439/00; B32B 15/08; B32B 2457/10; B32B 2250/03; C09J 175/06; C09J 175/08; C08G 18/4238; C08G 18/4854; B65D 65/40; Y02P 70/50
See application file for complete search history.

(56) References Cited

U.S. PATENT DOCUMENTS

| | | | | |
|---|---|---|---|---|
| 2008/0286635 | A1 | 11/2008 | Seino et al. | |
| 2012/0121944 | A1 | 5/2012 | Yamamoto et al. | |
| 2012/0142799 | A1* | 6/2012 | Gehringer | C08G 18/4816 521/155 |
| 2014/0242450 | A1 | 8/2014 | Oono et al. | |
| 2014/0243472 | A1* | 8/2014 | Jo | C08G 18/6696 524/590 |
| 2014/0370368 | A1* | 12/2014 | Kaibin | B32B 15/08 429/163 |
| 2017/0104189 | A1 | 4/2017 | He et al. | |
| 2017/0121537 | A1* | 5/2017 | Mohr | C08G 18/348 |

FOREIGN PATENT DOCUMENTS

| | | | |
|---|---|---|---|
| CN | 106104843 A | 11/2016 | |
| CN | 106571432 A | 4/2017 | |
| JP | 2009242786 A | 10/2009 | |
| JP | 4380728 B2 | 12/2009 | |
| JP | 2012252932 A | 12/2012 | |
| JP | 2015170461 A | 9/2015 | |
| JP | 2017-025287 A | 2/2017 | |
| WO | WO-2016181867 A1 * | 11/2016 | ............. H01G 11/78 |

OTHER PUBLICATIONS

Shimizu Hyoue: Journal of Network polymer vol. 32, No. 6 (201 I) "Properties of Xylylene Diisocyanate and Its Application for a Hardener of Paint". See p. 316 and english abstract.
"Adhesive for Metals", Zhang Yulong, I st Edition, pp. 244-246, Beijing-Sinopec Press, May 31, 2004.
Office Action dated Aug. 4, 2021 in corresponding Chinese patent application 201811502064.6 dated Aug. 4, 2021 (pp. 1-9) and english translation thereof (pp. 1-10).
Office Action in corresponding JP application 2017250366 dated Nov. 24, 2021 (pp. 1-4).
Office Action dated Mar. 3, 2022 issued in corresponding Chinese patent 201811502064.6 (pp. 1-11).
Lie Strong,: "Adhesion Theory, Technology and Application", Lie Strong, 1st Edition, p. 113, Guangzhou: Warth Polytechnic University Press, Jan. 31, 2014 (See also English translation of the relevant portions in the corresponding CN Office Action translation).
Third-party Observation submitted to the Japan Patent Office dated Mar. 15, 2022 in Japanese patent application No. 2017-250366 (pp. 1-118).

* cited by examiner

PACKAGING MATERIAL FOR POWER STORAGE DEVICE, AND POWER STORAGE DEVICE

BACKGROUND OF THE INVENTION

Field of the Invention

Some embodiments of the present invention relate to a packaging material for a power storage device, such as, e.g., a capacitor and a battery used for a mobile device such as a smartphone and a tablet, and a battery or a capacitor used to store electricity for a hybrid vehicle, an electric vehicle, a wind power generation system, a solar power generation system, and a nighttime electricity storage. They also relate to a power storage device packaged with the packaging material.

Note that in this specification and claims, the term "aromatic multifunctional isocyanate" means a multifunctional isocyanate exhibiting a chemical structural formula in which the N atom of —NCO (isocyanate functional group) is directly bonded to the C atom constituting an aromatic ring (benzene ring). The term "aliphatic multifunctional isocyanate having an aromatic ring" means a multifunctional isocyanate exhibiting a chemical structural formula in which the N atom of the —NCO (isocyanate functional group) is linked to the C atom constituting an aromatic ring (benzene ring) via one or more linking groups such as a methylene group. That is, the term "aliphatic multifunctional isocyanate having an aromatic ring" does not include a multifunctional isocyanate exhibiting a chemical structural formula in which the N atom of —NCO (isocyanate functional group) is directly bonded to the C atom constituting an aromatic ring (benzene ring).

Description of the Related Art

The following description of related art set forth the inventor's knowledge of related art and certain problems therein and should not be construed as an admission of knowledge in the prior art.

In recent years, with the slimming down and weight reduction of mobile electric devices such as smart phones and tablet terminals, as a packaging material for a power storage device, such as, e.g., a lithium-ion secondary battery, a lithium polymer secondary battery, a lithium-ion capacitor, and an electric double layer capacitors, in place of a conventional metal can, a laminate composed of a heat resistant resin layer/an outer adhesive layer/a metal foil layer/an inner adhesive layer/a heat fusible resin layer (inner sealant layer) is used. Furthermore, a power source for an electric vehicle, etc., a large-sized power source for a storage application, a capacitors and the like are increasingly packaged with the laminate (packaging material) having the aforementioned structure. Stretch forming and deep drawing are performed on the laminate, so that the laminate is formed into a three-dimensional shape, such as, e.g., a substantially rectangular parallelepiped shape. By forming such a three-dimensional shape, an accommodation space for accommodating a power storage device main body can be secured.

For the purpose of preventing delamination (separation) between the heat resistant resin layer and the metal layer, it is known to use an adhesive agent containing a multifunctional isocyanate group as an outer adhesive agent (see Patent Document 1). In this Patent Document 1, it is described that it is preferable to use tolylene diisocyanate as the multifunctional isocyanate.

Patent Document 1: Japanese Patent No. 4380728

Problems to be Solved by the Invention

However, a packaging material for a battery using tolylene diisocyanate as a multifunctional isocyanate group has a problem that the outer adhesive layer turns yellow due to contact with an electrolyte in an atmosphere in contact with an electrolyte, resulting in poor appearance. Of course, it is only necessary to pay attention to manufacturing, etc., so that electrolyte contact does not occur. However, in practice, it is difficult to prevent an electrolyte from adhering to a packaging material during the production, etc. For this reason, it has been required to make a composition that an outer adhesive agent itself does not yellow even if an electrolyte adheres to the packaging material.

SUMMARY OF THE INVENTION

Some embodiments in this disclosure have been made in view of the aforementioned technical background, and aim to provide a packaging material for a power storage device excellent in yellowing resistance, sufficient in adhesive strength of an outer adhesive agent, and excellent in formability, and also aims to provide a power storage device packaged with the packaging material.

Means for Solving the Problems

In order to attain the aforementioned object, some embodiments of the present invention provide the following means.

[1] A packaging material for a power storage device, comprising:
a base material layer as an outer layer;
a heat fusible resin layer as an inner layer; and
a metal foil layer arranged between the base material layer and the heat fusible resin layer,
wherein the base material layer and the metal foil layer are adhered via an outer adhesive layer,
wherein the outer adhesive layer is formed of a cured film of a two-part curing type urethane adhesive agent including a main agent containing a polyol and a multifunctional isocyanate mixture, wherein a content rate of the polyol is 50 mass % to 95 mass %, and
wherein the multifunctional isocyanate mixture is composed of a mixture containing an aromatic multifunctional isocyanate and an aliphatic multifunctional isocyanate having an aromatic ring.

[2] The packaging material for a power storage device as recited in the aforementioned Item [1], wherein a content rate of the aromatic multifunctional isocyanate in the multifunctional isocyanate mixture is 5 mass % to 50 mass %, and wherein a content rate of the aliphatic multifunctional isocyanate having the aromatic ring in the multifunctional isocyanate mixture is 50 mass % to 95 mass %.

[3] The packaging material for a power storage device as recited in the aforementioned Item [1] or [2],
wherein the polyol is a polyester polyol,
wherein the polyester polyol contains a dicarboxylic acid component, and
wherein the dicarboxylic acid component contains aromatic dicarboxylic acid, and a content rate of the aromatic dicarboxylic acid in the dicarboxylic acid component is 40 mol % to 80 mol %.

[4] The packaging material for a power storage device as recited in any one of the aforementioned Items [1] to [3],
wherein the aliphatic multifunctional isocyanate having the aromatic ring is one or more types of isocyanates selected from the group consisting of xylylene diisocyanate and a modified product thereof.

[5] The packaging material for a power storage device as recited in any one of the aforementioned Items [1] to [4], wherein a Young's modulus of the cured film of the two-part curing type urethane adhesive agent is 90 MPa to 400 MPa.

[6] A packaging case for a power storage device composed of a formed product of the packaging material for a power storage device as recited in any one of the aforementioned Items [1] to [5].

[7] A power storage device, comprising:
a power storage device main body; and
one or two types of packaging members selected from the group consisting of the packaging material for a power storage device as recited in any one of claims 1 to 5 and the packaging case for a power storage device as recited in the aforementioned Item [6],
wherein the power storage device main body is packaged with the packaging member.

Effects of the Invention

In some embodiments of the present invention, the multifunctional isocyanate mixture is composed of a mixture containing an aromatic multifunctional isocyanate and an aliphatic multifunctional isocyanate having an aromatic ring. Therefore, the outer adhesive layer is less likely to yellow, so that the packaging material is excellent in yellowing resistance, and the sufficient adhesive strength of the outer adhesive agent can be obtained, so that the formability is also good.

According to the invention as recited in the aforementioned Item [2], the yellowing resistance can be further improved, and the formability can also be improved. Furthermore, the adhesive strength of the outer adhesive agent can also be improved.

According to the invention as recited in the aforementioned Item [3], since a polyester polyol is used as the polyol and the content rate of the aromatic dicarboxylic acid in the dicarboxylic acid component is 40 mol % or more, delamination (separation) between the outer layer and the metal foil layer can be prevented more sufficiently. Further, since the content rate of the aromatic dicarboxylic acid in the dicarboxylic acid component is 80 mol % or less, the adhesive strength of the outer adhesive agent can be secured more sufficiently.

According to the invention as recited in the aforementioned Item [4], the yellowing resistance can be further improved.

According to the invention as recited in the aforementioned Item [5], since the Young's modulus of the cured film of the two-part curing type urethane adhesive agent is 90 MPa or more, the heat resistance of the outer adhesive layer can be improved, which can sufficiently prevent delamination (separation) between the outer layer and the metal foil layer at the time of the heat sealing. Further, since the Young's modulus is 400 MPa or less, it is possible to sufficiently secure the adhesive strength of the outer adhesive agent and also possible to improve the high-temperature lamination strength.

In the invention as recited in the aforementioned item [6], it is possible to provide a packaging case for a power storage device in which the outer adhesive layer is less likely to yellow and excellent in yellowing resistance of the packaging material, the adhesive strength of the outer adhesive agent can be secured sufficiently, and the molding is performed well.

According to the invention as recited in the aforementioned item [7], it is possible to provide a power storage device packaged with a packaging material excellent in yellowing resistance and sufficient in adhesive strength of the outer adhesive agent.

BRIEF DESCRIPTION OF THE DRAWINGS

Some embodiments of the present invention are shown by way of example, and not limitation, in the accompanying figures.

EMBODIMENT FOR CARRYING OUT THE INVENTION

In the following paragraphs, some embodiments in the present disclosure will be described by way of example and not limitation. It should be understood based on this disclosure that various other modifications can be made by those in the art based on these illustrated embodiments.

Figure 1:
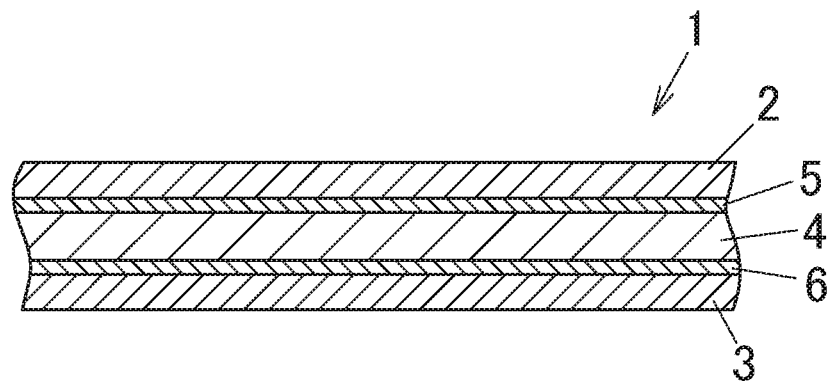
FIG. 1 is a cross-sectional view showing one embodiment of a packaging material for a power storage device according to the present invention.

One embodiment of a packaging material 1 for a power storage device according to the present invention is shown in FIG. 1. This packaging material 1 for a power storage device is used for a lithium ion secondary battery case.

The packaging material 1 for a power storage device is configured such that a base material layer (outer layer) 2 is integrally laminated on one surface of a metal foil layer 4 via an outer adhesive layer 5 and that a heat fusible resin layer (inner layer) 3 is integrally laminated on the other surface of the aluminum foil layer 4 via an inner adhesive layer 6.

The packaging material 1 for a power storage device according to the present invention is configures as follows. The outer adhesive layer 5 is formed by a cured coating of a two-part curing type urethane adhesive agent in which a main agent containing a polyol and a multifunctional isocyanate mixture are contained and the polyol content rate is 50 mass % to 95 mass %. The multifunctional isocyanate mixture is composed of a mixture containing an aromatic multifunctional isocyanate and an aliphatic multifunctional isocyanate having an aromatic ring. Therefore, the outer adhesive layer is less likely to yellow, so that the packaging material is excellent in yellowing resistance, and the sufficient adhesive strength of the outer adhesive agent can be obtained, so that the formability is also good.

In the present invention, it is preferably configured such that the main agent constituting the two-part curing type urethane adhesive agent is one containing a polyol and contains 50 mass % or more of the polyol. When the polyol content rate in the main agent is 50 mass % or more, it is possible to further increase the adhesive force, which can sufficiently prevent occurrence of delamination (separation) between the outer layer 2 and the metal foil layer 4. In particular, the polyol content rate in the main agent is more preferably 70 mass % or more, and particularly preferably 90 mass % or more.

The polyol is not particularly limited, and examples thereof include a polyester polyol, a polyether polyol, a polycaprolactone diol, and the like. In the present invention, the polyester polyol includes a urethane-modified polyester polyol (polyester polyurethane polyol, etc.), and the polyether polyol includes a urethane-modified polyether polyol (polyether polyurethane polyol, etc.). Among them, as the polyol, it is preferable to use a copolymer polyester polyol made from dicarboxylic acid and diol as raw materials. In the present invention, by appropriately selecting the type and the composition of the dicarboxylic acid and the diol as raw materials, the adhesive strength can be further enhanced, so that the interlayer separation can be prevented even when deeper forming is performed.

The dicarboxylic acid is not particularly limited, and examples thereof include aliphatic dicarboxylic acid and aromatic dicarboxylic acid. The aliphatic dicarboxylic acid is not particularly limited, and examples thereof include oxalic acid, malonic acid, succinic acid, glutaric acid, adipic acid, pimelic acid, suberic acid, azelaic acid, sebacic acid, and the like. In addition, the aromatic dicarboxylic acid is not particularly limited, and examples thereof include phthalic acid, isophthalic acid, terephthalic acid, and the like.

The diol is not particularly limited, and examples thereof include ethylene glycol, propylene glycol, 1,3-butanediol, 1,4-butanediol, diethylene glycol, dipropylene glycol, neopentyl glycol, 1,5-pentanediol, 1,6-hexanediol, octanediol, 1,4-cyclohexanediol, 2-butyl-2-ethyl-1,3-propanediol, and the like.

In cases where a polyester polyol is used as the polyol, it is preferably configured such that the polyester polyol includes a dicarboxylic acid component (including a dicarboxylic acid ester derived from a dicarboxylic acid) and that the dicarboxylic acid component contains an aromatic dicarboxylic acid. The content rate of the aromatic dicarboxylic acid in the dicarboxylic acid component is preferably 40 mol % to 80 mol %, more preferably 50 mol % to 70 mol %.

The number average molecular weight (Mn) of the polyol is preferably within the range of 8,000 to 25,000. In this case, it is possible to give appropriate coating film strength and coating film elongation as the outer adhesive layer 5.

The number average molecular weight of the polyester polyol can be adjusted by chain elongation with multifunctional isocyanate. That is, when the polyester components in the main agent are linked with NCO, a polymer with a terminal hydroxyl group is produced, and by adjusting the equivalent ratio between the isocyanate group and the hydroxyl group of the polyester, the number average molecular weight of the polyester polyol can be adjusted. In the present invention, it is preferable to use those linked so that the equivalent ratio (OH/NCO) is in the range of 1.01 to 10. In addition, as another molecular weight adjusting method, adjustments of the reaction conditions (such as, e.g., the compounding molar ratio of the dicarboxylic acid to the diol) of the condensation polymerization reaction of the dicarboxylic acid and the diol can be exemplified.

As the main agent, for example, a main agent in which a polyhydric alcohol is added to the polyol of an essential component may be used. The polyhydric alcohol is not particularly limited, and examples thereof include trimethylolpropane (TMP), methylpentanediol, dimethylbutanediol, ethylene glycol, 1,4-butanediol, glycerin, sorbitol, and the like.

The multifunctional isocyanate mixture is composed of a mixture containing an aromatic multifunctional isocyanate and an aliphatic multifunctional isocyanate having an aromatic ring.

The aromatic multifunctional isocyanate is not particularly limited, and examples thereof include tolylene diisocyanate (TDI), diphenylmethane diisocyanate (MDI), triphenylmethane triisocyanate, and the like. Among them, as the aromatic multifunctional isocyanate, it is preferable to use one or more types of aromatic multifunctional isocyanates selected from the group consisting of multifunctional isocyanate modified products from at least one types of tolylene diisocyanate, diphenylmethane diisocyanate, and diisocyanate. The modifying means is not particularly limited, and examples thereof include, in addition to an adduct product with water, glycerin, a multifunctional active hydrogen compound such as trimethylolpropane, etc., a multifunctional isocyanate modified product by a multimerization reaction of isocyanurate, carbodiimide, polymerizate, etc.

The aliphatic multifunctional isocyanate having an aromatic ring is not particularly limited, and examples thereof include xylylene diisocyanate (XDI), tetramethylxylylene diisocyanate (TMXDI) and a multifunctional isocyanate modified product from at least one type of xylylene diisocyanate (XDI) and tetramethylxylylene diisocyanate (TMXDI), etc. The modifying means is not particularly limited, and examples thereof include, in addition to an adduct product with water, glycerin, a multifunctional active hydrogen compound such as, e.g., trimethylolpropan, a multifunctional isocyanate modified product by a multimerization reaction, such as, e.g., isocyanuration, carbodiimidization, and polymerizattion. Among these, it is preferable to use one or more types of isocyanates selected from the group consisting of xylylene diisocyanate and its modified product.

It is preferably configured such that the content rate of the aromatic multifunctional isocyanate in the multifunctional isocyanate mixture be 5 mass % to 50 mass % and the content rate of the "aliphatic multifunctional isocyanate having an aromatic ring" in the multifunctional isocyanate mixture be 50 mass % to 95 mass %. In this case, the yellowing resistance can be further improved, the formability can also be improved, and the adhesive strength of the outer adhesive agent 5 can also be improved. When the content rate of the aromatic multifunctional isocyanate is 5 mass % or more, the formability can be further improved, and when the content rate of the aromatic multifunctional isocyanate is 50 mass % or less, the yellowing resistance can be further improved. When the content rate of the aliphatic multifunctional isocyanate having an aromatic ring is 50 mass % or more, the yellowing resistance can be further improved, and when the content rate of aliphatic multifunctional isocyanate having an aromatic ring is 95 mass % or less, the formability can be further improved.

In the two-part curing type urethane adhesive agent (cured film of a urethane adhesive agent), the content rate of the polyol component is set to 50 mass % to 95 mass %. When the content rate of the polyol component is 50 mass % or more, the adhesive strength of the outer adhesive agent can be sufficiently improved, and when the content rate of the polyol component is 95 mass % or less, sufficient sealing resistance can be ensured. Among them, in the two-part curing type urethane adhesive agent, the content rate of the polyol component is preferably 60 mass % to 90 mass %. Further, in the two-part curing type urethane adhesive agent, the content rate of the multifunctional isocyanate mixture is preferably 40 mass % to 10 mass %. Furthermore, in the two-part curing type urethane adhesive agent (cured film of the urethane adhesive agent), it is more preferable that the content rate of the polyol component be 70 mass % to 90 mass % and the content rate of the multifunctional isocyanate mixture be 30 mass % to 10 mass %.

In the above-described two-part curing type urethane adhesive agent composed of a polyol constituting the main agent and a multifunctional isocyanate mixture as the curing agent, the isocyanate group (—NCO) of the multifunctional isocyanate mixture is preferably blended at a ratio of 1 mole to 30 moles per 1 mole of a hydroxyl group (—OH) of the polyol. When the molar ratio ([NCO]/[OH]) is 1 or more, a sufficient curing reaction is carried out to obtain proper coating film strength and heat resistance. Further, when the molar ratio ([NCO]/[OH]) is 30 or less, a reaction with a functional group other than a polyol does not proceed excessively, and therefore proper coating film strength and appropriate elongation can be obtained. Among them, the molar ratio ([NCO]/[OH]) of an isocyanate group of a multifunctional isocyanate mixture to a hydroxyl group of a polyol is particularly preferably within the range of 2 to 26.

In the two-part curing type urethane adhesive agent, in addition to the components described above, as the need arises, a reaction catalyst used at the time of urethanization elongation of a polyester polyol and at the time of urethane curing reaction of a two-part curing type urethane adhesive agent, a coupling agent for improving adhesion, an epoxy resin, an acrylic resin, and various well-known additives, such as, e.g., an antifoaming agent, a leveling agent, an ultraviolet absorber, and an antioxidant, may be added to the main agent or the curing agent.

It is preferable to adopt a configuration in which the Young's modulus of the cured film of the two-part curing type urethane adhesive agent is 90 MPa to 400 MPa. When the Young's modulus of the cured film is 90 MPa or more, the heat resistance of the outer adhesive layer 5 can be improved, which can more sufficiently prevent the delamination (separation) between the outer layer 2 and the metal foil layer 4 at the time of the heat sealing. When the Young's modulus of the cured film is 400 MPa or less, it is possible to sufficiently secure the adhesive strength of the outer adhesive agent and also possible to improve the high-temperature lamination strength. In particular, the Young's modulus of the cured film of the two-part curing type urethane adhesive agent is more preferably 140 MPa to 300 MPa.

The thickness of the outer adhesive layer 5 is preferably set to 1 μm to 5 μm. In particular, from the viewpoint of thinning and weight reduction of the packaging material, the thickness of the outer adhesive layer 5 is particularly preferably set to 1 μm to 3 μm.

In the present invention, it is preferable that the base material layer (outer layer) 2 be formed of a heat resistant resin layer. As the heat resistant resin constituting the heat resistant resin layer 2, a heat resistant resin which does not melt at the heat sealing temperature when heat sealing the packaging material 1 is used. As the heat resistant resin, it is preferable to use a heat resistant resin having a melting point higher by 10° C. or more than the melting point (the melting point of the layer having the highest melting point when the heat fusible resin layer is formed of multiple layers) of the heat fusible resin layer 3. It is particularly preferable to use a heat resistant resin having a melting point higher by 20° C. or more than the melting point (the melting point of the layer having the highest melting point when the heat fusible resin layer is formed of multiple layers) of the heat fusible resin layer 3.

The heat resistant resin layer (outer layer) 2 is not particularly limited, and examples thereof include a polyamide film such as a nylon film and a polyester film, and a stretched film thereof is preferably used. Among them, as the heat resistant resin layer 2, it is particularly preferable to use a biaxially stretched polyamide film, such as, e.g., a biaxially stretched nylon film, a biaxially stretched polybutylene terephthalate (PBT) film, a biaxially stretched polyethylene terephthalate (PET) film, or a biaxially stretched polyethylene naphthalate (PEN) film. The nylon film is not particularly limited, and examples thereof include a 6 nylon film, a 6, 6 nylon film, an MXD nylon film, and the like. Note that the heat resistant resin layer 2 may be formed of a single layer or may be formed of multiple layers (multiple layers composed of a PET film/a nylon film, or the like) made of, for example, a polyester film/a polyamide film.

The thickness of the heat resistant resin layer (outer layer) 2 is preferably 2 μm to 50 μm. In the case of using a polyester film, the thickness is preferably 2 μm to 50 μm, and in the case of using a nylon film, the thickness is preferably 7 μm to 50 μm. When the thickness is set to the above-described preferable lower limit value or more, sufficient strength as a packaging material can be secured, and when the thickness is set to the above-described preferable upper limit value or less, the stress at the time of molding, such as, e.g., stretch forming and drawing, can be reduced, which enables to improve the formability.

The heat fusible resin layer (inner layer) 3 plays a roll of giving an excellent chemical resistance against a corrosiveness strong electrolyte used in a lithium-ion secondary battery and the like and imparting a heat sealing property to a packaging material.

The heat fusible resin layer 3 is not particularly limited, but is preferably a heat fusible resin non-stretched film layer. The heat fusible resin non-stretched film layer 3 is not particularly limited, but is preferably composed of an non-stretched film made of at least one type of a heat fusible resin selected from the group consisting of polyethylene, polypropylene, an olefin based copolymer, an acid-modified product thereof, and an ionomer. Note that the heat fusible resin layer 3 may be a single layer or multiple layers.

The thickness of the heat fusible resin layer 3 is preferably set to 10 μm to 80 μm. When the thickness is 10 μm or more, it is possible to sufficiently prevent occurrence of pinholes, and when the thickness is 80 μm or less, the amount of resin used can be reduced, capable of attaining the cost reduction. In particular, the thickness of the heat fusible resin layer 3 is particularly preferably set to 25 μm to 50 μm.

The heat fusible resin layer 3 may contain a lubricant. As the lubricant, although not particularly limited, a fatty acid amide is suitably used. The fatty acid amide is not particularly limited, and examples thereof include a saturated fatty acid amide, an unsaturated fatty acid amide, a substituted amide, a methylol amide, a saturated fatty acid bisamide, an unsaturated fatty acid bisamide, a fatty acid ester amide, an aromatic bisamide, etc.

The metal foil layer 4 plays a role of imparting a gas barrier property to prevent penetration of oxygen and moisture into the packaging material 1. The metal foil layer 4 is not particularly limited, and examples thereof include an aluminum foil, a SUS foil (stainless steel foil), a copper foil, a nickel foil, and the like, and an aluminum foil is generally used. The thickness of the metal foil layer 4 is preferably 5 μm to 50 μm. When the thickness is 5 μm or more, it is possible to prevent occurrence of pinholes during rolling when producing a metal foil, and when the thickness is 50 μm or less, the stress at the time of molding, such as, e.g., stretch forming and drawing, can be reduced and therefore the formability can be improved. In particular, the thickness of the metal foil layer 4 is particularly preferably 10 μm to 30 μm.

It is preferable that the metal foil layer 4 is subjected to a chemical conversion treatment at least on the inner surface (the surface on the side of the second adhesive layer 6). By being subjected to such a chemical conversion treatment, it is possible to sufficiently prevent corrosion of the metal foil surface due to the contents (battery electrolyte, etc.). For example, the metal foil is subjected to a chemical conversion treatment by performing the following process. That is, for example, a chemical conversion treatment is performed by coating one of the following aqueous solutions 1) to 3) on the surface of the metal foil subjected to a degreasing treatment, followed by drying.

1) an aqueous solution of a mixture containing:
   phosphoric acid;
   chromic acid; and
   at least one type of a compound selected from the group consisting of a metal salt of fluoride and a non-metal salt of fluoride
2) an aqueous solution of a mixture containing:
   phosphoric acid;
   at least one type of a resin selected from the group consisting of an acryl based resin, a chitosan derivative resin, and a phenol based resin; and
   at least one type of a compound selected from the group consisting of chromic acid and chromium (III) salt
3) an aqueous solution of a mixture containing: phosphoric acid;
   at least one type of a resin selected from the group consisting of an acryl based resin, a chitosan derivative resin, and a phenol based resin;
   at least one type of a compound selected from the group consisting of chromic acid and chromium (III) salt; and
   at least one type of a compound selected from the group consisting of a fluoride metal salt and a fluoride non-metal salt The chemical conversion coating film is preferably 0.1 mg/m$^2$ to 50 mg/m$^2$, particularly preferably 2 mg/m$^2$ to 20 mg/m$^2$ as a chromium adhesion amount (per one surface).

The inner adhesive layer 6 is not particularly limited. For example, one exemplified as the above-mentioned inner adhesive layer 5 can be used, but it is preferable to use a polyolefin based adhesive agent with little swelling due to an electrolyte. The thickness of the inner adhesive layer 6 is preferably set to 1 μm to 5 μm. In particular, from the viewpoint of thinning and weight reduction of the packaging material, the thickness of the inner adhesive layer 6 is particularly preferably set to 1 μm to 3 μm.

Figure 3:
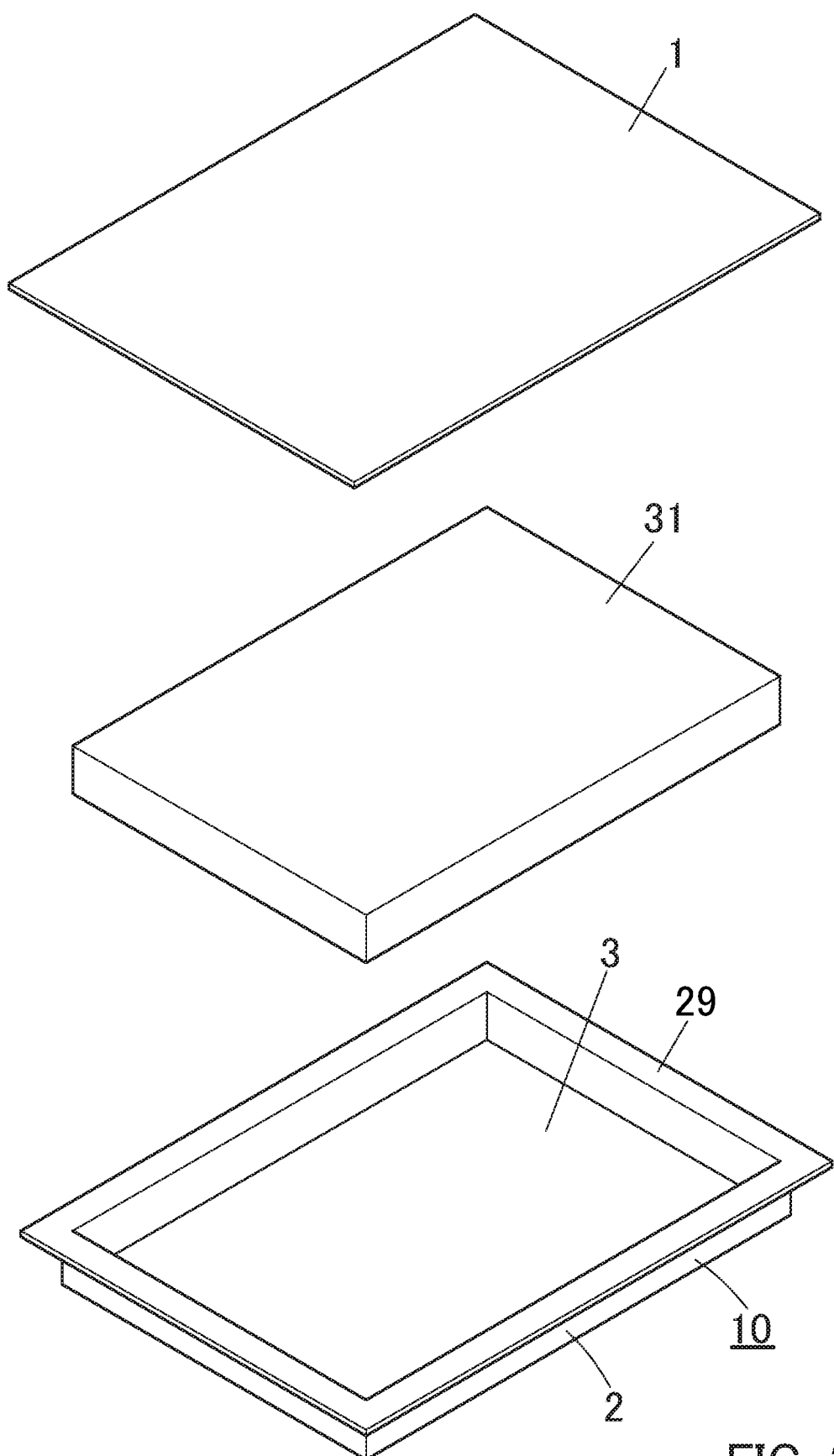
FIG. 3 is a perspective view showing a packaging material (planar shape), a power storage device main body, and a packaging case (three-dimensionally formed product) composing the power storage device of FIG. 2 in a detached state before heat-sealing them.

The packaging case (battery case or the like) 10 can be obtained by forming (deep drawing, stretch forming, etc.) the packaging material 1 for a power storage device of the present invention (see FIG. 3). Note that the packaging material 1 of the present invention can also be used as it is without being subjected to forming (see FIG. 3).

Figure 2:
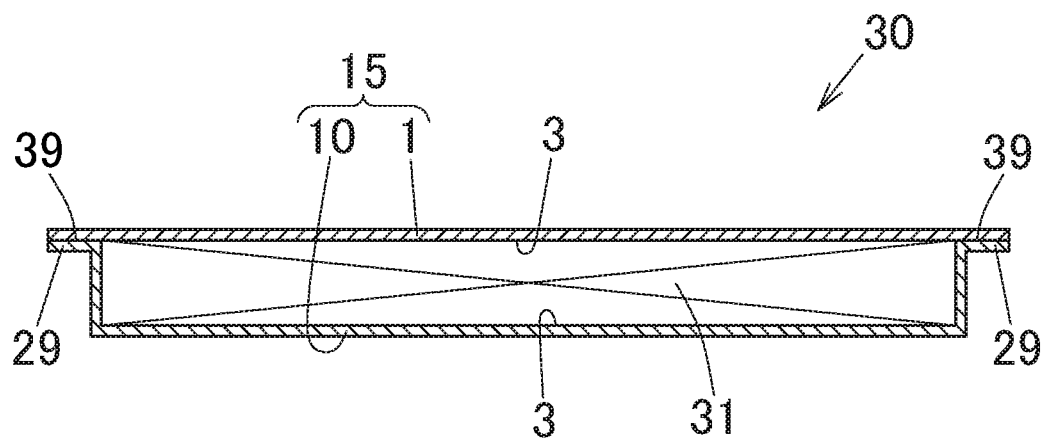
FIG. 2 is a cross-sectional view showing one embodiment of a power storage device according to the present invention.

An embodiment of the power storage device 30 configured using the packaging material 1 for a power storage device of the present invention is shown in FIG. 2. This power storage device 30 is a lithium ion secondary battery. In this embodiment, as shown in FIG. 2 and FIG. 3, the packaging member 15 is constituted by the packaging case 10 obtained by molding the packaging material 1 and the planar packaging material 1. The power storage device 30 of the present invention is constituted (see FIG. 2 and FIG. 3) by accommodating a substantially rectangular parallelepiped power storage device main body (electrochemical element or the like) 31 in an accommodation recess of an packaging case 10 obtained by shaping the packaging material 1 of the present invention, arranging the packaging material 1 of the present invention on the power storage device main body 31 without being shaped with its heat fusible resin layer 3 side facing inward (lower side), and heat-sealing the peripheral portion of the heat fusible resin layer 3 of the planar packaging material 1 and the heat fusible resin layer 3 of the flange portion (sealing peripheral portion) 29 of the packaging case 10 to be heat-sealed (see FIG. 2 and FIG. 3). Note that the inner side surface of the accommodation recess of the packaging case 10 is a heat fusible resin layer 3, and the outer surface of the accommodation recess is a base material layer (outer layer) 2 (see FIG. 3).

In FIG. 2, the reference numeral 39 denotes a heat seal portion in which the peripheral portion of the packaging material 1 and the flange portion (sealing peripheral portion) 29 of the packaging case 10 are joined (welded). Note that, in the power storage device 30, the tip end portion of a tab lead connected to the power storage device main body 31 is led to the outside of the packaging member 15, but the illustration is omitted.

Although the power storage device main body 31 is not particularly limited, it may be exemplified by, for example, a battery main body portion, a capacitor main body portion, and an electrical condenser main body portion.

It is preferable that the width of the heat seal portion 39 be set to 0.5 mm or more. When the width is set to 0.5 mm or more, sealing can be reliably performed. In particular, it is preferable that the width of the heat seal portion 39 be set to 3 mm to 15 mm.

Note that in the above-described embodiment, the packaging member 15 is configured by the packaging case 10 obtained by shaping the packaging material 1 and the planar packaging material 1 (see FIG. 2 and FIG. 3). However, the present invention is not particularly limited to such a combination. For example, the packaging member 15 may be constituted by a pair of planer packaging materials 1, or may be constituted by a pair of packaging cases 10.

EXAMPLES

Next, specific examples of the present invention will be described, but the present invention is not particularly limited to those of these examples.

Example 1

A polyester polyol solution which is a main agent of a two-part curing type urethane adhesive agent is prepared. A polyester polyol as a main agent component was obtained by melting neopentyl glycol of 30 parts by mole, ethylene glycol of 30 parts by mole, 1,6-hexanediol of 40 parts by mole at 80° C., and, while stirring, by subjecting a dicarboxylic acid mixture consisting of adipic acid, which is an aliphatic dicarboxylic acid, of 40 parts by mole and isophthalic acid, which is aromatic dicarboxylic acid, of 60 parts by mole to a condensation polymerization reaction at 210° C. for 20 hours. This polyester polyol has the number average molecular weight (Mn) of 15,000. Ethyl acetate of 60 parts by mass was added to the obtained polyester polyol (main agent) of 40 parts by mass and uniformly dissolved, so that a polyester polyol solution having a solid content of 40 mass % and a hydroxyl value of 3.0 mg KOH/g (solution value) was obtained.

To this polyester polyol solution of 80 parts by mass, an isocyanurate multifunctional polyisocyanate solution (NCO content rate: 7.6 mass %, solid content: 50 mass %) of tolylene diisocyanate (TDI) as a curing agent of 6 parts by mass and an adduct polyisocyanate solution (NCO content rate: 11.9 mass %, solid content: 75 mass %) consisting of xylylene diisocyanated (XDI) and trimethylolpropane as a curing agent of 14 parts by mass were mixed, and stirred. Thus, a two-part curing type urethane adhesive agent was obtained. In this two-part curing type urethane adhesive agent, the content rate of a polyol in a solid content (in the outer adhesive layer) was 70.3 mass %. Further, in the two-part curing type urethane adhesive agent, the solid content content rate of the aromatic multifunctional isocyanate in the solid content of all curing agents was 22.2 mass %, and the solid content content rate of the "aliphatic multifunctional isocyanate having an aromatic ring" in the solid content of all curing agents was 77.8 mass %.

Next, a chemical conversion treatment solution comprising polyacrylic acid, a trivalent chromium compound, water, and alcohol was applied to both surfaces of an aluminum foil (A8079 aluminum foil specified by JIS H4160) having a thickness of 35 μm and dried at 150° C. Thus, an aluminum foil having a chemical conversion coating film on both surfaces was prepared. The chromium adhesion amount of this chemical conversion coating film was 5 mg/m$^2$ per one surface.

Next, the two-part curing type urethane adhesive agent was applied to one surface of the aluminum foil having the chemical conversion coating film formed on both surfaces thereof so that the coating amount after drying became 3.5 g/m$^2$ and dried to form an outer adhesive layer 5. A biaxially stretched polyamide film (base material layer) 2 having a thickness of 15 μm was adhered to the surface of the outer adhesive layer 5. A polyacrylic adhesive agent was coated on the other surface of the aluminum foil 4 and dried to form an inner adhesive layer 6. An unstretched polypropylene film (heat fusible resin layer) 3 having a thickness of 30 μm was adhered to the surface of the inner adhesive layer 6. The laminate was left stand for 9 days in an environment at 40° C. (aging treatment was performed), so that a packaging material 1 for a power storage device having the structure shown in FIG. 1 was obtained.

Example 2

A packaging material 1 for a power storage device shown in FIG. 1 was obtained in the same manner as in Example 1 except that as a curing agent, in place of the isocyanurate multifunctional polyisocyanate solution of 6 parts by mass of the tolylene diisocyanate (TDI) of Example 1, an isocyanurate multifunctional polyisocyanate solution (NCO content rate: 7.5 mass %, solid content: 50 mass %) of 6 parts by mass of diphenylmethane diisocyanate (MDI) was used (see Table 1).

Example 3

A packaging material 1 for a power storage device shown in FIG. 1 was obtained in the same manner as in Example 1 except that as a curing agent, in place of the isocyanurate multifunctional polyisocyanate solution of 6 parts by mass of the tolylene diisocyanate (TDI) of Example 1, an isocyanurate multifunctional polyisocyanate solution (NCO content rate: 7.6 mass %, solid content: 50 mass %) of 3 parts by mass of tolylene diisocyanate (TDI) and isocyanurate multifunctional polyisocyanate solution (NCO content rate: 7.5 mass %, solid content: 50 mass %) of 3 parts by mass of diphenylmethane diisocyanate (MDI) were used (see Table 1).

Example 4

A packaging material 1 for a power storage device shown in FIG. 1 was obtained in the same manner as in Example 1 except that as a curing agent, in place of the isocyanurate multifunctional polyisocyanate solution of 6 parts by mass of the tolylene diisocyanate (TDI) of Example 1 and an adduct polyisocyanate solution of 14 parts by mass of xylylene diisocyanated (XDI) and trimethylolpropane, isocyanurate multifunctional polyisocyanate solution of tolylene diisocyanate (TDI) (NCO content rate: 7.6 mass %, solid content: 50 mass %) of 4 parts by mass and an adduct polyisocyanate solution of 16 parts by mass (NCO content rate: 11.9 mass %, solid content: 75 mass %) of xylylene diisocyanated (XDI) and trimethylolpropane as a curing agent were mixed (see Table 1) and stirred to obtain a two-part curing type urethane adhesive agent.

Example 5

A packaging material 1 for a power storage device shown in FIG. 1 was obtained in the same manner as in Example 1 except that as a curing agent, in place of the isocyanurate multifunctional polyisocyanate solution of 6 parts by mass of the tolylene diisocyanate (TDI) of Example 1 and an adduct polyisocyanate solution of 14 parts by mass of xylylene diisocyanated (XDI) and trimethylolpropane, isocyanurate multifunctional polyisocyanate solution of 8 parts by mass (NCO content rate: 7.6 mass %, solid content: 50 mass %) of tolylene diisocyanate (TDI) and an adduct polyisocyanate solution of 12 parts by mass (NCO content rate: 11.9 mass %, solid content: 75 mass %) of xylylene diisocyanated (XDI) and trimethylolpropane as a curing agent were mixed (see Table 1) and stirred to obtain a two-part curing type urethane adhesive agent.

Example 6

A packaging material 1 for a power storage device shown in FIG. 1 was obtained in the same manner as in Example 1 except that as a curing agent, in place of the isocyanurate multifunctional polyisocyanate solution of 6 parts by mass of the tolylene diisocyanate (TDI) of Example 1 and an adduct polyisocyanate solution of 14 parts by mass of xylylene diisocyanated (XDI) and trimethylolpropane, an isocyanurate multifunctional polyisocyanate solution of 10 parts by mass (NCO content rate: 7.6 mass %, solid content: 50 mass %) of tolylene diisocyanate (TDI) and an adduct polyisocyanate solution of 10 parts by mass (NCO content rate: 11.9 mass %, solid content: 75 mass %) of xylylene diisocyanated (XDI) and trimethylolpropane as a curing agent were mixed (see Table 1) and stirred to obtain a two-part curing type urethane adhesive agent.

Example 7

A packaging material 1 for a power storage device shown in FIG. 1 was obtained in the same manner as in Example 1 except that as the dicarboxylic acid mixture, a dicarboxylic acid mixture consisting of adipic acid, which is an aliphatic dicarboxylic acid, of 65 parts by mole and isophthalic acid, which is aromatic dicarboxylic acid, of 35 parts by mole was used (see Table 1).

Example 8

A packaging material 1 for a power storage device shown in FIG. 1 was obtained in the same manner as in Example 1 except that as the dicarboxylic acid mixture, a dicarboxylic acid mixture consisting of adipic acid, which is an aliphatic dicarboxylic acid, of 55 parts by mole and isophthalic acid, which is aromatic dicarboxylic acid, of 45 parts by mole was used (see Table 1).

Example 9

A packaging material 1 for a power storage device shown in FIG. 1 was obtained in the same manner as in Example 1 except that as the dicarboxylic acid mixture, a dicarboxylic acid mixture consisting of adipic acid, which is an aliphatic dicarboxylic acid, of 20 parts by mole and isophthalic acid, which is aromatic dicarboxylic acid, of 80 parts by mole was used (see Table 1).

Example 10

A packaging material 1 for a power storage device shown in FIG. 1 was obtained in the same manner as in Example 1 except that as the dicarboxylic acid mixture, a dicarboxylic acid mixture consisting of adipic acid, which is an aliphatic dicarboxylic acid, of 15 parts by mole and isophthalic acid, which is aromatic dicarboxylic acid, of 85 parts by mole was used (see Table 1).

Example 11

A packaging material 1 for a power storage device shown in FIG. 1 was obtained in the same manner as in Example 1 except that as the dicarboxylic acid mixture, a dicarboxylic acid mixture consisting of adipic acid, which is an aliphatic dicarboxylic acid, of 10 parts by mole and isophthalic acid, which is aromatic dicarboxylic acid, of 90 parts by mole was used (see Table 1).

Example 12

A packaging material 1 for a power storage device shown in FIG. 1 was obtained in the same manner as in Example 1 except that the compounding ratio of the main agent (solution)/the curing agent (solution) in the two-part curing type urethane adhesive agent was changed to the main agent (solution)/the curing agent (solution)=5 parts by mass/35 parts by mass (see Table 1).

Example 13

A packaging material 1 for a power storage device shown in FIG. 1 was obtained in the same manner as in Example 1 except that the compounding ratio of the main agent (solution)/the curing agent (solution) in the two-part curing type urethane adhesive agent was changed to the main agent (solution)/the curing agent (solution)=70 parts by mass/30 parts by mass (see Table 1).

Example 14

A packaging material 1 for a power storage device shown in FIG. 1 was obtained in the same manner as in Example 1 except that the compounding ratio of the main agent (solution)/the curing agent (solution) in the two-part curing type urethane adhesive agent was changed to the main agent (solution)/the curing agent (solution)=90 parts by mass/10 parts by mass (see Table 1).

Example 15

A packaging material 1 for a power storage device shown in FIG. 1 was obtained in the same manner as in Example 1 except that as main agent (solution), in place of the polyester polyol solution of 80 parts by mass of Example 1, the following polyether polyurethane polyol solution (denoted as "polyol O" in Table 1) of 80 parts by mass was used (see Table 1).

The polyether polyurethane polyol solution was prepared as follows. As a polyether polyol, polytetramethylene ether glycol (hydroxyl value 112 mg: KOH/g) of 500 parts by mass and tolylene diisocyanate of 82.2 parts by mass were charged in a reaction vessel and reacted at 100° C. for 7 hours while stirring to complete the reaction. Thereafter, ethyl acetate of 388.1 parts by mass was charged to obtain a polyether polyurethane polyol solution (the solid content: 40 mass %, the number average molecular weight of polyether polyurethane polyol: 14,500, hydroxyl value: 3.1 mgKOH/g) (solution value).

Example 16

A packaging material 1 for a power storage device shown in FIG. 1 was obtained in the same manner as in Example 1 except that as the main agent (solution), in place of the polyester polyol solution of 80 parts by mass of Example 1, a polyester polyurethane polyol solution (denoted as "polyol M" in Table 1) of 80 parts by mass was used (see Table 1).

As a preparation of the polyester polyurethane polyol solution, a polyester polyol was prepared. Neopentyl glycol of 30 parts by mole, ethylene glycol of 30 parts by mole, and 1,6-hexane diol of 40 parts by mole were mixed and melted at 80° C. While stirring, a dicarboxylic acid mixture consisting of adipic acid, which is an aliphatic dicarboxylic acid, of 40 parts by mole and isophthalic acid, which is aromatic dicarboxylic acid, of 60 parts by mole were subjected to a condensation polymerization reaction at 210° C. for 20 hours. Thus, a polyester polyol having a hydroxyl value of 56 mgKOH/g and an acid value of 0.4 mgKOH/g was obtained. Next, the obtained polyester polyol of 500 parts by mass and tolylene diisocyanate of 39.2 parts by mass were charged into a reaction vessel and reacted at 100° C. for 7 hours while stirring to complete the reaction. Thereafter, ethyl acetate of 359.4 parts by mass was charged to obtain a polyester polyurethane polyol solution (the solid content: 40 mass %, the number average molecular weight of polyester polyurethane polyol: 14,700, hydroxyl value: 3.1 mgKOH/g) (solution value).

Example 17

A packaging material 1 for a power storage device shown in FIG. 1 was obtained in the same manner as in Example 1 except that as a curing agent (aliphatic multifunctional isocyanate having an aromatic ring), in place of an adduct polyisocyanate solution of 14 part by mass of xylylene diisocyanated (XDI) and trimethylolpropane of Example 1, an adduct polyisocyanate solution of 14 parts by mass (NCO content rate: 10.2 mass %, solid content: 75 mass %) of tetramethyl xylylene diisocyanated (TMXDI) and trimethylolpropane was combined (see Table 1) and stirred to obtain a two-part curing type urethane adhesive agent.

Comparative Example 1

A packaging material for a power storage device was obtained in the same manner as in Example 1 except that as a curing agent, in place of the isocyanurate multifunctional polyisocyanate solution of 6 parts by mass of the tolylene diisocyanate (TDI) of Example 1 and an adduct polyisocyanate solution of 14 parts by mass of xylylene diisocyanated (XDI) and trimethylolpropane, an isocyanurate multifunctional polyisocyanate solution (NCO content rate: 7.5 mass %, solid content: 50 mass %) of 20 parts by mass of diphenylmethane diisocyanate (MDI) was used (see Table 1).

Comparative Example 2

A packaging material for a power storage device was obtained in the same manner as in Example 1 except that as a curing agent, in place of the isocyanurate multifunctional polyisocyanate solution of 6 parts by mass of the tolylene diisocyanate (TDI) of Example 1 and an adduct polyisocyanate solution of 14 parts by mass of xylylene diisocyanated (XDI) and trimethylolpropane, an isocyanurate multifunctional polyisocyanate solution of 20 parts by mass (NCO content rate: 7.6 mass %, solid content 50 mass %) of tolylene diisocyanate (TDI) (see Table 1).

Comparative Example 3

A packaging material for a power storage device was obtained in the same manner as in Example 1 except that as a curing agent, in place of the isocyanurate multifunctional polyisocyanate solution of 6 parts by mass of the tolylene diisocyanate (TDI) of Example 1 and an adduct polyisocyanate solution of 14 parts by mass of xylylene diisocyanated (XDI) and trimethylolpropane, an adduct polyisocyanate solution of 20 parts by mass (NCO content rate: 11.9 mass %, solid content: 75 mass %) of xylylene diisocyanated (XDI) and trimethylolpropane was used was used (see Table 1).

The Young's modulus of the cured film of the two-part curing type urethane adhesive agent (outer adhesive agent) used in Examples 1 to 17 and Comparative Examples 1 to 3 are shown in Table 1. The Young's modulus was measured in accordance with JIS K7127-1999 (tensile test method of plastic film). Specifically, each outer adhesive agent was coated on a glass plate to a thickness of 50 μm, then heated aged at 40° C. for 11 days to thermally cure the outer adhesive agent to form a cured product having a thickness of 46 μm. The cured product was peeled off from the glass plate, cut into a size of 150 mm in length, 10 mm in width, and 46 mm in thickness to prepare a test piece, and under conditions of an initial distance between chucks of 100 mm and a distance between gauge marks of 50 mm, Young's modulus (MPa) was determined by conducting a tensile test at a pulling rate of 200 mm/min using a strograph (tensile testing apparatus) (AGS-5kNX) manufactured by Shimadzu Access Corporation.

TABLE 1

| | Base component | | | Curing agent (solid component ratio) | | | | |
|---|---|---|---|---|---|---|---|---|
| | Composition (solid content ratio) polyol/curing agent (mass %)/(mass %) | Type | Content ratio (mol %) of aromatic dicarboxylic acid in the dicarboxylic acid component | Aromatic multifunctional isocyanate | | Aliphatic polyfunctional isocyanate having an aromatic ring | | Young's modulus of cured film of urethane adhesive (MPa) |
| | | | | Type | Mass % | Type | Mass % | |
| Ex. 1 | 70.3/29.7 | Polyester polyol | 60 | TDI system | 22.2 | XDI system | 77.8 | 150 |
| Ex. 2 | 70.3/29.7 | Polyester polyol | 60 | MDI system | 22.2 | XDI system | 77.8 | 150 |
| Ex. 3 | 70.3/29.7 | Polyester polyol | 60 | TDI system/ MDI system | 22.2 | XDI system | 77.8 | 150 |
| Ex. 4 | 70.3/29.7 | Polyester polyol | 60 | TDI system | 14.3 | XDI system | 85.7 | 130 |
| Ex. 5 | 70.3/29.7 | Polyester polyol | 60 | TDI system | 30.8 | XDI system | 69.2 | 180 |
| Ex. 6 | 70.3/29.7 | Polyester polyol | 60 | TDI system | 40.0 | XDI system | 60.0 | 220 |
| Ex. 7 | 70.3/29.7 | Polyester polyol | 35 | TDI system | 22.2 | XDI system | 77.8 | 70 |
| Ex. 8 | 70.3/29.7 | Polyester polyol | 45 | TDI system | 22.2 | XDI system | 77.8 | 90 |
| Ex. 9 | 70.3/29.7 | Polyester polyol | 80 | TDI system | 22.2 | XDI system | 77.8 | 280 |
| Ex. 10 | 70.3/29.7 | Polyester polyol | 85 | TDI system | 22.2 | XDI system | 77.8 | 320 |
| Ex. 11 | 70.3/29.7 | Polyester polyol | 90 | TDI system | 22.2 | XDI system | 77.8 | 410 |
| Ex. 12 | 52.4/47.6 | Polyester polyol | 60 | TDI system | 22.2 | XDI system | 77.8 | 180 |
| Ex. 13 | 58.0/42.0 | Polyester polyol | 60 | TDI system | 22.2 | XDI system | 77.8 | 160 |
| Ex. 14 | 84.2/15.8 | Polyester polyol | 60 | TDI system | 22.2 | XDI system | 77.8 | 120 |
| Ex. 15 | 70.3/29.7 | Polyol O *1) | | TDI system | 22.2 | XDI system | 77.8 | 110 |
| Ex. 16 | 70.3/29.7 | Polyol M *2) | 60 | TDI system | 22.2 | XDI system | 77.8 | 130 |
| Ex. 17 | 70.3/29.7 | Polyester polyol | 60 | TDI system | 22.2 | TMXDI system | 77.8 | 110 |
| Comp. Ex. 1 | 70.3/29.7 | Polyester polyol | 60 | MDI system | 100 | | | 1300 |
| Comp. Ex. 2 | 70.3/29.7 | Polyester polyol | 60 | TDI system | 100 | | | 1200 |
| Comp. Ex. 3 | 70.3/29.7 | Polyester polyol | 60 | | | XDI system | 100 | 120 |

*1) Polyol O: Polyether polyurethane polyol
*2) Polyol M: Polyester polyurethane polyol

TABLE 2

| | Evaluation results | | | |
|---|---|---|---|---|
| | Yellowing resistance | formability | Hot Lamination strength | Seal resistance |
| Ex. 1 | ⊚ | ⊚ | ⊚ | ⊚ |
| Ex. 2 | ⊚ | ⊚ | ⊚ | ⊚ |
| Ex. 3 | ⊚ | ⊚ | ⊚ | ⊚ |
| Ex. 4 | ⊚ | ○ | ⊚ | ⊚ |
| Ex. 5 | ⊚ | ⊚ | ⊚ | ⊚ |
| Ex. 6 | ○ | ⊚ | ⊚ | ⊚ |
| Ex. 7 | ⊚ | ⊚ | ⊚ | △ |
| Ex. 8 | ⊚ | ⊚ | ⊚ | ○ |
| Ex. 9 | ⊚ | ⊚ | ⊚ | ⊚ |
| Ex. 10 | ⊚ | ⊚ | ○ | ⊚ |
| Ex. 11 | ⊚ | ⊚ | △ | ⊚ |
| Ex. 12 | ⊚ | ⊚ | ⊚ | ⊚ |
| Ex. 13 | ⊚ | ⊚ | ⊚ | ⊚ |
| Ex. 14 | ⊚ | ⊚ | ⊚ | ⊚ |
| Ex. 15 | ⊚ | ⊚ | ⊚ | ○ |
| Ex. 16 | ⊚ | ⊚ | ⊚ | ⊚ |
| Ex. 17 | ⊚ | ⊚ | ⊚ | ⊚ |
| Comp. Ex. 1 | X | ⊚ | ⊚ | ⊚ |
| Comp. Ex. 2 | X | ⊚ | ⊚ | ⊚ |
| Comp. Ex. 3 | ⊚ | X | ⊚ | ⊚ |

Evaluation was performed on each packaging material for a power storage device obtained as described above based on the following evaluation method. The results are shown in Table 2.

<Yellowing Resistance Evaluation Method>

A packaging material for a power storage device was immersed in an electrolyte in which lithium hexafluorophosphate ($LiPF_6$) was dissolved at a concentration of 1,000 ppm in a mixed solvent in which ethylene carbonate (EC) and dimethyl carbonate (DMC) were mixed in an equivalent volume ratio and stored at 45° C. for 24 hours, then the packaging material for a power storage device was taken out, washed with water and dried. For the packaging material for a power storage device after drying, the Lab value from the outer layer side was measured using a color difference colorimeter CM-2500C manufactured by Konica Minolta Co., Ltd., and the b value was evaluated based on the following judgment criteria based on the judgment criteria of yellowing degree. The larger the b value, the stronger the yellow color.

(Judgment Criteria)

"⊚" . . . b value is 1.0 or less (passed)
"○" . . . b value is greater than 1.0 and 2.0 or less (passed)
"X" . . . b value is greater than 2.0

<Formability Evaluation Method>

Using deep drawing free straight dies, deep drawing 1 stage forming was performed on a packaging material under the following forming conditions. Formability was evaluated for each forming depth (9.0 mm, 8.5 mm, 8.0 mm, 7.5 mm, 7.0 mm, 6.5 mm, 6.0 mm, 5.5 mm, 5.0 mm, 4.5 mm, 4.0 mm, 3.5 mm, 3.0 mm, 2.5 mm, 2.0 mm). The maximum forming depth (mm) at which good forming with no pinhole occurred at the corner was examined and the formability was evaluated based on the following criteria. The presence or absence of pinholes was examined by visually observing the presence or absence of the transmitted light transmitted through the pinhole.

(Forming Conditions)

Forming die . . . Punch: 33.3 mm×53.9 mm, Die: 80 mm×120 mm, Corner R: 2 mm, Punch R: 1.3 mm, Die R: 1 mm Blank-holder pressure . . . Gauge pressure: 0.475 MPa, Actual pressure (calculated value): 0.7 MPa Material: SC (carbon steel) material, chrome plated only on the punch R.

(Judgment Criteria)

"⊚": the maximum forming depth at which no pinholes and cracks occur is 7.0 mm or more (passed)
"○": the maximum forming depth at which no pinholes and cracks occur is 5.0 mm or more and less than 7.0 mm (passed)
"X": the maximum forming depth at which no pinholes and cracks occur is less than 5.0 mm <Hot Lamination Strength Evaluation Method>

A test specimen having a width of 15 mm and a length of 150 mm was cut out from the obtained packaging material for a power storage device and the test specimen was held for 1 minute under a temperature environment of 120° C. Thereafter, under the 120° C. environment, in accordance with JIS K6854-3 (1999), using a strograph (tensile testing device) (AGS-5kNX) manufactured by Shimadzu Access Corporation, a T type separation was made between the outer layer 2 and the metal foil layer 4 at a pulling rate of 100 mm/min and the peeling strength was measured. This was defined as the hot lamination strength (N/15 mm width) and evaluated based on the following criteria.

(Judgment Criteria)

"⊚": hot laminate strength is equal to or larger than "2.0 N/15 mm width" (passed)
"○": hot laminate strength is "1.5 N/15 mm width" or more and less than "2.0 N/15 mm width" (passed)
"△": hot laminate strength is "1.0 N/15 mm width" or more and less than "1.5 N/15 mm width" (passed)
"X": hot laminate strength is less than "1.0 N/15 mm width"

<Sealing Resistance Evaluation Method>

A deep drawing single step molding with a forming depth of 5.0 mm was performed to a packaging material using a forming depth free straight forming die. Thereafter, in a state in which the peripheral edge portions of a pair of molded articles are overlapped so as to contact each other's inner layers. In this state, using a heat seal device (TP-701-A) manufactured by Tester Sangyo Co., Ltd., under the condition of the heat sealing temperature: 170° C., the sealing pressure: 0.2 MPa (gauge display pressure), and the sealing time: 6 seconds, heat sealing was performed by heating on one surface. The appearance of the heat sealed product was visually observed to examine the presence or absence of the floating point and the delamination point (separation point) between the outer layer and the metal foil layer of the heat sealed article and its length. Sealing resistance was evaluated based on the following criteria.

(Judgment Criteria)

"⊚": There was no floating point or delamination point (passed)
"○": the length of the floating point, the delamination point exceeded 0 mm and was 2 mm or less (passed)
"△": floating point, the length of the delamination point exceeded 2 mm and was 4 mm or less (passed)
"X" . . . floating point, the length of the delamination point was longer than 4 mm.

As is apparent from the table, the packaging material for a power storage device of Examples 1 to 17 of the present invention was excellent in yellowing resistance, ensured good formability, and had sufficient hot laminate strength. The seal resistance was also good.

In contrast, in Comparative Examples 1 and 2 in which aromatic multifunctional isocyanate was used alone as a curing agent, it was inferior to the yellowing resistance. In Comparative Example 3 using aliphatic multifunctional isocyanate having an aromatic ring as a curing agent, it was inferior to formability.

INDUSTRIAL APPLICABILITY

The packaging material for a power storage device according to the invention can be used as a packaging material for various power storage devices, such as, for specific examples, a power storage device, a lithium-ion capacitor, and an electric double layer capacitor, such as a lithium secondary battery (lithium ion battery, lithium polymer battery etc). The power storage device according to the present invention includes not only the power storage device exemplified above but also an all solid state battery.

The present application claims priority to Japanese Patent Application No. 2017-250366 filed on Dec. 27, 2017, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention. The present invention allows any design changes unless departing from its spirit within the scope of the claims.

DESCRIPTION OF REFERENCE SYMBOLS 1 packaging material for a power storage device
2 base material layer (outer layer)
3 heat fusible resin layer (inner layer)
4 metal foil layer
5 outer adhesive layer
10 packaging case
15 packaging member
30 power storage device
31 power storage device main body

The invention claimed is:

1. A packaging material for a power storage device, comprising:
   a base material layer as an outer layer;
   a heat fusible resin layer as an inner layer; and
   a metal foil layer arranged between the base material layer and the heat fusible resin layer,
   wherein the base material layer and the metal foil layer are adhered via an outer adhesive layer,
   wherein the base material layer is formed of a heat resistant resin layer,
   wherein the outer adhesive layer is formed of a cured film of a two-part curing type urethane adhesive agent including a main agent containing a polyol and a multifunctional isocyanate mixture, wherein a content rate of the polyol is 50 mass % to 95 mass %,
   wherein the multifunctional isocyanate mixture is consisting of a mixture containing an aromatic multifunctional isocyanate and an aliphatic multifunctional isocyanate having an aromatic ring, wherein, in the multifunctional isocyanate mixture, the aliphatic multifunctional isocayanate having an aromatic ring is present in a higher amount than the aromatic multifunctional isocyanate,
   wherein the aliphatic multifunctional isocyanate having the aromatic ring is a modified product,
   wherein a content rate of the aromatic multifunctional isocyanate in the multifunctional isocyanate mixture is 5 mass % to 40 mass %, and
   wherein a content rate of the aliphatic multifunctional isocyanate having the aromatic ring in the multifunctional isocyanate mixture 60 mass % to 95 mass %, and
   which packaging material is suitable to be formed into a three-dimensional shape.

2. The packaging material for a power storage device as recited in claim 1,
   wherein the polyol is a polyester polyol,
   wherein the polyester polyol contains a dicarboxylic acid component, and
   wherein the dicarboxylic acid component contains aromatic dicarboxylic acid, and a content rate of the aromatic dicarboxylic acid in the dicarboxylic acid component is 40 mol % to 80 mol %.

3. The packaging material for a power storage device as recited in claim 1, which packaging material has been formed into a three-dimensional shape.

4. The packaging material for a power storage device as recited in claim 1,
   wherein a Young's modulus of the cured film of the two-part curing type urethane adhesive agent is 90 MPa to 400 MPa.

5. A packaging case for a power storage device comprising a formed product of the packaging material for a power storage device as recited in claim 1.

6. A power storage device, comprising:
   a power storage device main body; and
   one or two types of packaging members selected from the group consisting of the packaging material for a power storage device as recited in claim 1 and the packaging case for a power storage device comprising a formed product of the packaging material for said power storage device,
   wherein the power storage device main body is packaged with the packaging member.

7. The packaging material for a power storage device as recited in claim 1,
   wherein the aliphatic multifunctional isocyanate having the aromatic ring is a modified product of xylylene diisocyanate.

8. The packaging material for a power storage device as recited in claim 1,
   wherein the aliphatic multifunctional isocyanate having the aromatic ring is a modified product of tetramethylxylylene diisocyanate.

9. The packaging material for a power storage device as recited in claim 1,
   wherein the aliphatic multifunctional isocyanate having the aromatic ring is a modified product of diphenylmethane diisocyanate.

10. The packaging material for a power storage device as recited in claim 1,
    wherein the aromatic multifunctional isocyanate is a modified product of tolylene diisocyanate.

11. The packaging material for a power storage device as recited in claim 1,
    wherein the aromatic multifunctional isocyanate is a modified product of triphenylmethane triisocyanate.

12. The packaging material for a power storage device as recited in claim 1, wherein the base material layer is formed of a heat resistant resin layer has a melting point higher by 10° C. or more than the melting point of the heat fusible resin layer.

13. The packaging material for a power storage device as recited in claim 1, wherein the base material layer is formed of a heat resistant resin layer has a melting point higher by 20° C. or more than the melting point of the heat fusible resin layer.

14. A packaging material for a power storage device, comprising:
- a base material layer as an outer layer;
- a heat fusible resin layer as an inner layer; and
- a metal foil layer arranged between the base material layer and the heat fusible resin layer,
- wherein the base material layer and the metal foil layer are adhered via an outer adhesive layer,
- wherein the base material layer is formed of a heat resistant resin layer,
- wherein the outer adhesive layer is formed of a cured film of a two-part curing type urethane adhesive agent including a main agent containing a polyol and a multifunctional isocyanate mixture, wherein a content rate of the polyol is 50 mass % to 95 mass %,
- wherein the multifunctional isocyanate mixture is consisting of a mixture containing an aromatic multifunctional isocyanate and an aliphatic multifunctional isocyanate having an aromatic ring, wherein, in the multifunctional isocyanate mixture, the aliphatic multifunctional isocayanate having an aromatic ring is present in a higher amount than the aromatic multifunctional isocyanate,
- wherein the aliphatic multifunctional isocyanate having the aromatic ring is a modified product,
- wherein a content rate of the aromatic multifunctional isocyanate in the multifunctional isocyanate mixture is 5 mass % to 40 mass %, and
- wherein a content rate of the aliphatic multifunctional isocyanate having the aromatic ring in the multifunctional isocyanate mixture is 60 mass % to 95 mass %,
- which packaging material is suitable to be formed into a three-dimensional shape, and
- wherein the outer adhesive layer does not turn yellow due to contact with an electrolyte.

* * * * *